UNITED STATES PATENT OFFICE 2,402,955

LUMINESCENT MATERIAL

Herman C. Froelich, Cleveland, Ohio, assignor to General Electric Company, a corporation of New York No Drawing. Application December 18, 1942, Serial No. 469,467

7 Claims. (Cl. 252—301.4)

This invention relates to a combination of an electric discharge device producing radiation with a luminescent material or phosphor that is exposed to this radiation to be excited to luminescence, and particularly a combination of a phosphor with a source of long wave ultraviolet radiation. The invention involves a novel type of phosphor that is most advantageously and powerfully excited by ultraviolet radiation of about 3000 Å. to 3900 Å., and especially 3650 Å.—to which ordinary glass is transparent—though also excitable in some degree by other means, such as the 2537 Å. resonance radiation of mercury. For 3650 Å. excitation, a layer of my phosphor may be coated on the inner surface of an enclosing jacket of a high-pressure mercury vapor lamp, as illustrated in McKeag et al. Patent 2,103,085, for example; or the phosphor layer may be employed to provide color in a design, a sign, a dial, or the like, that is exposed to the radiation from such a lamp. The quality of fluorescent light from my phosphor makes the phosphor very suitable for markings or indicia that must be clearly seen at night, whether in total darkness, or in the presence of the limited light from a clear night sky. For this purpose, the phosphor has the special advantage that its luminous output is substantially free of any blue components.

Phosphors consist in general of a major proportion of a so-called base material or matrix and a minor proportion of another material called an activator. The luminescent qualities of the phosphor depend on the relations between matrix and activator materials, as determined by heat-treatment which they undergo together, as well as on the identity of these materials themselves. For the convenience of those desiring to use my invention, I will describe preferred species of phosphor advantageously embodying the invention, and their manufacture. Various features and advantages of the invention will become apparent from this description. In referring to my fluorescent material as "phosphor," I follow present common usage of the art, without any implication as to phosphorescent afterglow.

As the base material or matrix of my phosphor, I employ a zirconate, and more especially a zirconate of an element of the second group of the periodic system. I have found that zirconate of strontium activated with bismuth gives a yellow fluorescence of good brightness and of desirable blue-free quality without any perceptible afterglow, and can be synthesized on a practical basis, while the zirconate of barium is less readily formed, and that of cadmium still less readily. Aside from this special group of metals comprising strontium, barium, and cadmium, the usual reactions for forming zirconates of elements of the second group of the periodic system either give poor yields, or do not occur, practically speaking. Other activators for these zirconates give but feeble fluorescence: e. g., silver gives a weak yellow light, copper a weak red, and praseodymium a weak orange. Only a small amount of activator is necessary, such as about 1 per cent or less; while more than such a substantial fractional percentage ordinarily gives no increase of the fluorescent output. Generally speaking, there is little advantage in using more than ½ per cent of activator in the phosphor, calculated on the basis of the content of activating metal. Of course a phosphor may in practice comprise zirconates of a plurality of different elements, or may have a plurality of different activators, or both.

My zirconate phosphor can be synthesized by heating or calcining together (with exposure to the air) compounds of zirconium and of other metal(s) which react together to form zirconate of such other metal(s), according to a basic reaction which may be broadly represented:

$$ZrO_2 + SrO \rightarrow SrZrO_3$$

I prefer, however, to bring about reaction between components that are one or both in their nascent state, by heating together substances which break down under heat to yield zirconium and strontium oxides, thus giving a reaction such as the following:

$$ZrO_2 + SrSO_4 \rightarrow SrZrO_3 + SO_3$$

$$Zr(SO_4)_2 + SrSO_4 \rightarrow SrZrO_3 + 3SO_3$$

While $SO_3$ is formed in the decomposition of the sulphate(s), this breaks down at the high temperature of the furnace according to the equation $$2SO_3 \rightleftharpoons 2SO_2 + O_2$$

so that some sulphur dioxide is given off, as well as the trioxide. The most complete reaction is obtained when $ZrO_2$ is present in excess, and when a suitable flux is used—whether a volatile flux like aluminum fluoride ($AlF_3$), or a non-volatile one like lead monoxide (PbO) or a compound that yields lead monoxide when heated. The use of a suitable flux also enhances the fluorescent brightness of the phosphor, just about doubling it according to my experience. In this respect, lead monoxide is somewhat the better, which may be due to some accessory activating influence of the lead of the fluxing component in the final phosphor—although lead alone does not activate strontium zirconate to emit visible light. The brightness of the phosphor is also improved by quenching or chilling suddenly after heating.

The incorporation of activator material into the matrix may be combined with the preparation of the zirconate by adding a suitable compound of bismuth (for example) to the batch of reactants for forming the zirconate. I have obtained favorable results with about ½ per cent of bismuth, though the proportion of activator used is not critical. I have found bismuth nitrate ($Bi(NO_3)_3$) in aqueous solution a convenient vehicle for the incorporation of bismuth in the batch. Following this method, the other batch ingredients used (including the flux) may be mixed together in a fine state of division, and this mixture may be wetted down to a stiff paste or slurry with the aqueous solution of bismuth nitrate. All ingredients, including bismuth nitrate, should be of the high purity generally used in the preparation of phosphors, and preferably of at least C. P. grade. The dry batch may consist of 1.3 mol. $ZrO_2$ with 1 mol. $SrSO_4$ and about 0.05 to 0.1 mol. PbO or $PbSO_4$, corresponding to:

| | Grams |
|---|---|
| Zirconia ($ZrO_2$) | 160 |
| Strontium sulphate ($SrSO_4$) | 184 |
| Lead monoxide (PbO) | 11 to 22 |

After thorough dry-mixing followed by wetting down with the bismuth nitrate solution to a slurry, which is itself mixed till uniform, the batch is dried by heat until all the water is evaporated off, and is thoroughly ground in a ball-mill until it will pass a 100-mesh screen, which usually requires about an hour in a four-quart ball-mill. The screened mixture may be fired or calcined (with exposure to the air) in a refractory crucible (as of porcelain, silica, or Alundum) in a refractory electric muffle furnace until the evolution of sulphurous gas from decomposition of the sulphate ceases, requiring a couple of hours at a temperature of some 1200° to 1300° C., more or less. While at about this temperature, the phosphor is suddenly quenched in water (at ordinary temperature such as some 10° to 20° C.), and is then dried, reground (as by ball-milling for about 10 min.), and sieved through a 100-mesh screen. It may be applied to the lamp tube or envelope on which it is used with the aid of a carbonaceous binder, in the usual manner, though any ball-milling to incorporate the powder in the binder should preferably be brief.

Under excitation by radiation of 3650° Å., the phosphor prepared as just described gives a canary yellow fluorescence that is considerably brighter than the fluorescence of zirconium silicate activated with bismuth, and is also brighter than that of cadmium tungstate activated with bismuth. Over the latter it also has the advantage that its emitted light comprises yellow, orange, and green with but very, very little blue. It has the further good characteristic of being perfectly stable in a humid atmosphere.

What I claim as new and desire to secure by Letters Patent of the United States is:

1. A phosphor of zirconate of metal of the group consisting of strontium, barium, and cadmium, activated with a minor proportion of bismuth.

2. A calcined and quenched phosphor of zirconate of metal of the group consisting of strontium, barium, and cadmium activated with a minor proportion of bismuth, and also containing fluxing lead monoxide in minor proportion.

3. A phosphor of strontium zirconate activated with a minor proportion of bismuth.

4. A phosphor of strontium zirconate activated with a fractional percentage of bismuth, and also containing in minor proportion a fluxing lead component.

5. A method of preparing a phosphor of zirconate of metal of the group consisting of strontium, barium and cadmium, activated with a minor proportion of bismuth which comprises calcining together, along with minor proportions of activating bismuth compound and flux components, compounds of zirconium and of metal of the group comprising strontium, barium, and cadmium, which compounds react to form zirconate of the metal.

6. A method of preparing a phosphor of zirconate of metal of the group consisting of strontium, barium and cadmium, activated with a minor proportion of bismuth which comprises calcining together, along with minor proportions of an activating bismuth compound and of lead monoxide, compounds of zirconium and of metal of the group comprising strontium, barium, and cadmium, which compounds react to form zirconate of the metal, and quenching the calcined product.

7. A method of preparing a phosphor of strontium zirconate activated with a minor proportion of bismuth which comprises calcining together, along with minor proportions of activating bismuth compound and of flux, compounds of zirconium and of strontium which react to form strontium zirconate.

HERMAN C. FROELICH.